United States Patent
Sekine

(10) Patent No.: US 8,405,857 B2
(45) Date of Patent: Mar. 26, 2013

(54) IMAGE PROCESSING APPARATUS, CONTROL METHOD FOR IMAGE PROCESSING APPARATUS, AND STORAGE MEDIUM STORING CONTROL PROGRAM THEREFOR

(75) Inventor: Hiroshi Sekine, Kawasaki (JP)

(73) Assignee: Canon Kabushiki Kaisha (JP)

( * ) Notice: Subject to any disclaimer, the term of this patent is extended or adjusted under 35 U.S.C. 154(b) by 536 days.

(21) Appl. No.: 12/716,879

(22) Filed: Mar. 3, 2010

(65) Prior Publication Data

US 2010/0225965 A1 Sep. 9, 2010

(30) Foreign Application Priority Data

Mar. 5, 2009 (JP) ................................. 2009-051982

(51) Int. Cl.
G06F 3/12 (2006.01)
H04L 29/06 (2006.01)
(52) U.S. Cl. ....................... 358/1.15; 713/161
(58) Field of Classification Search .................. 713/150, 713/183, 161; 380/278; 358/1.15
See application file for complete search history.

(56) References Cited

U.S. PATENT DOCUMENTS

| 5,359,660 A * | 10/1994 | Clark et al. ........................ 726/3 |
| 7,822,834 B2 * | 10/2010 | Kawai et al. ................... 709/221 |
| 2008/0003556 A1 | 1/2008 | Takahashi et al. |
| 2010/0100721 A1 * | 4/2010 | Su et al. ......................... 713/150 |
| 2011/0161665 A1 * | 6/2011 | Perez ............................. 713/161 |

FOREIGN PATENT DOCUMENTS

JP 2007-336287 A 12/2007

* cited by examiner

*Primary Examiner* — Jerome Grant, II
(74) *Attorney, Agent, or Firm* — Rossi, Kimms & McDowell LLP

(57) ABSTRACT

An image processing apparatus that is capable of preventing an unauthorized connection from a host apparatus which is not permitted to use a device by restricting a host apparatus that performs an association process by a method other than password authentication. A processing unit performs an association process with the host apparatus in order to perform the wireless communication. A storage unit stores a permitted host ID indicating the host apparatus that is permitted to perform the association process by the processing unit. A control unit compares a host ID transmitted from the host apparatus with the permitted host ID stored in the storage unit when the processing unit performs the association process, and determines whether the processing unit performs the association process based on a result of the comparison.

11 Claims, 22 Drawing Sheets

CABLE ASSOCIATION

NUMERIC ASSOCIATION

FIG.6

ASSOCIATION PERMISSION ID LIST

| HOST NAME | CHID |
|---|---|
| HOST 1 | xxxxxxxxxxxxxxx |
| HOST 2 | xxxxxxxxxxxxxxx |
| HOST 3 | xxxxxxxxxxxxxxx |
| HOST 4 | xxxxxxxxxxxxxxx |
| HOST 5 | xxxxxxxxxxxxxxx |

FIG.7

CC LIST

| HOST NAME | CC(CHID.CDID.CK) |
|---|---|
| HOST 1 | xxxxxxxxxxxxxxxxxxxxxxxxx |
| HOST 2 | xxxxxxxxxxxxxxxxxxxxxxxxx |
| HOST 5 | xxxxxxxxxxxxxxxxxxxxxxxxx |

*FIG.8*

MANAGER LIST

| HOST NAME | CHID |
|---|---|
| HOST 1 | xxxxxxxxxxxxxxx |
| HOST 2 | xxxxxxxxxxxxxxx |

*FIG.10*

CONNECTION: HOST3

YOU HAVE NO AUTHORITY TO EDIT ASSOCIATION PERMISSION ID LIST AND MANAGER LIST.

CONNECTION: HOST1

EDIT ASSOCIATION PERMISSION ID LIST

EDIT MANAGER LIST

FIG.12

ASSOCIATION PERMISSION ID LIST

EDITOR : HOST1 (CHID:xxxxxxxxxxxxxxxx)

| HOST NAME | CHID |
|---|---|
| HOST2 | xxxxxxxxxxxxxxxx |
| HOST3 | xxxxxxxxxxxxxxxx |
| HOST4 | xxxxxxxxxxxxxxxx |
| HOST5 | xxxxxxxxxxxxxxxx |
|  |  |

[ OK ]  [ CANCEL ]

FIG.13

MANAGER LIST

| HOST NAME | CHID |
|---|---|
| HOST1 | xxxxxxxxxxxxxxxx |
| HOST2 | xxxxxxxxxxxxxxxx |
|  |  |
|  |  |
|  |  |

OK    CANCEL

FIG.16

```
HOST3 (CHID:xxxxxxxxxxxxxxxx)

YOUR PC WAS DELETED FROM ASSOCIATION
PERMISSION ID LIST.
PLEASE CONTACT MANAGER.
```

*FIG.17*

| ASSOCIATION PERMISSION ID LIST | | |
|---|---|---|
| HOST NAME | CHID | ASSOCIATION IS COMPLETED |
| HOST1 | xxxxxxxxxxxxxxx | ○ |
| HOST2 | xxxxxxxxxxxxxxx | |
| HOST3 | xxxxxxxxxxxxxxx | ○ |
| HOST4 | xxxxxxxxxxxxxxx | |
| HOST5 | xxxxxxxxxxxxxxx | |

FIG.20

CONNECTION: HOST 1

HOST YOU TRY TO DELETE HAS BEEN ALREADY COMPLETED ASSOCIATION.

IF YOU DELETE HOST, YOU CANNOT CONNECT.
DO YOU DELETE HOST REALLY ?

IF YOU DELETE HOST UNDER CONNECTION, CONNECTION IS TERMINATED.

| CANCEL | OK |

FIG.21

CONNECTION: HOST 1

MANAGER YOU TRY TO DELETE HAS BEEN ALREADY COMPLETED ASSOCIATION.

IF YOU DELETE MANAGER, YOU CANNOT EDIT.
DO YOU DELETE MANAGER REALLY ?

| CANCEL | OK |

IMAGE PROCESSING APPARATUS, CONTROL METHOD FOR IMAGE PROCESSING APPARATUS, AND STORAGE MEDIUM STORING CONTROL PROGRAM THEREFOR

BACKGROUND OF THE INVENTION

1. Field of the Invention

The present invention relates to an image processing apparatus, which is capable of performing wireless communication with a host apparatus, a control method for the image processing apparatus, and a storage medium storing a control program therefor.

2. Description of the Related Art

A standard of wireless USB, which is a wireless version of a USB interface that is one of standards to connect a peripheral device to a computer, is known.

In wireless USB communication, a plurality of host apparatuses (PCs etc.) cannot communicate with one device (an image processing apparatus etc.) simultaneously, and one host apparatus can communicate with only one device. This is defined by the standard of the wireless USB (Wireless USB Specification Rev. 1.0).

An outline when a connection of one-to-one communication is established between the host apparatus and the device will be described with reference to FIG. 22.

FIG. 22 is a schematic view showing a system example in which the wireless USB communication is performed between the host apparatus 10 provided with a wireless USB antenna 11 and the device 20 provided with a wireless USB antenna 21. It should be noted that the host apparatus 10 may be a personal digital assistant (PDA) etc. besides a PC.

The host apparatus 10 transmits a wireless signal including host information (a host ID (CHID)). Receiving the wireless signal concerned, the device 20 retrieves a CC (a connection context) having a host ID that is identical to the received host ID from a storage device thereof. The CC consists of the host ID, a device ID, a connection key, etc.

When there is the CC having the host ID that is identical to the received host ID as a result of retrieving the storage device thereof, the device 20 transmits the device ID (CDID) to the host apparatus 10 to perform a connection request.

When receiving the connection request, the host apparatus 10 retrieves a CC having a host ID that is identical to the received host ID from a storage device thereof. When there is the CC having the host ID that is identical to the received host ID, the host apparatus 10 starts a connection process to establish the one-to-one communication with the device 20.

When the host apparatus 10 outputs a print request to the device 20, the above-mentioned connection process is performed. After the communication is established, the host apparatus 10 generates print data by an application thereof, and transmits the print data to the device 20 by encryption communication.

In order that the host apparatus 10 and the device 20 perform the connection process by the wireless USB communication and establish the encryption communication, it is necessary to perform an association process to associate the host apparatus 10 with the device 20.

The association process is usually performed before a first connection to share a common CC between the host apparatus 10 and the device 20. When the association process is once performed by the host apparatus 10 and the device 20, the wireless connection can be performed without performing a specific process at a second time or later.

In the wireless USB standard, a cable association model and a numeric association model are defined as the association process that associates the host apparatus 10 and the device 20.

The cable association model enables communication by the wireless USB between the host apparatus 10 and the device 20 after the host apparatus 10 is associated with the device 20 by connecting by a wired cable (an association process is performed) once.

The numeric association model enables communication by the wireless USE between the host apparatus 10 and the device 20 without particular operations after the host apparatus 10 is associated with the device 20 by the wireless USB communication.

For example, in the numeric association model, the host apparatus 10 and the device 20 are installed within an area that allows the wireless communication, and an association button of the device 20 is pushed. By pushing the association button of the device 20, the same numeric value of about four-digit is displayed on a display screen of the host apparatus 10 and a display screen of the device 20. The above-mentioned operations complete the association process.

Incidentally, the above-mentioned association process has a problem that a person other than a device owner (who is permitted to use the device) can communicate with the device without particular operations at a second connection or later as long as the person has completed the association process once. That is, since any host apparatuses can connect with the device if the association process goes so far as to be finished, a person who is not permitted to use the device can access the device easily.

In order to prevent such an unauthorized access, Japanese laid-open patent publication (Kokai) No. 2007-336287 (JP2007-336287A) discloses a technique that allows to execute the association process only when a password transmitted from the host apparatus matches a password stored in the device as a comparison result.

However, since the technique in the above-mentioned publication requires authentication with a password before executing the association process, there is a problem that a person who is not permitted to use the device can unauthorizedly access the device, when the person unauthorizedly obtained the password. In addition, the technique has poor usability to an authorized user who is permitted to use the device, because the user has to remember the password.

SUMMARY OF THE INVENTION

The present invention provides a mechanism for preventing an unauthorized connection from a host apparatus that is not permitted to use a device by restricting a host apparatus that performs an association process by a method other than password authentication.

Accordingly, a first aspect of the present invention provides an image processing apparatus that is possible to perform wireless communication with a host apparatus to receive data from the host apparatus, comprising a processing unit adapted to perform an association process with the host apparatus in order to perform the wireless communication, a storage unit adapted to store a permitted host ID indicating the host apparatus that is permitted to perform the association process by the processing unit, and a control unit adapted to compare a host ID transmitted from the host apparatus with the permitted host ID stored in the storage unit and to determine whether the processing unit performs the association process based on a result of the comparison when the processing unit performs the association process.

Accordingly, a second aspect of the present invention provides a control method for an image processing apparatus that is possible to perform wireless communication with a host apparatus to receive data from the host apparatus, the control method comprising a processing step of performing an association process with the host apparatus in order to perform the wireless communication, a storing step of storing a permitted host ID indicating the host apparatus that is permitted to perform the association process in the processing step, and a control step of comparing a host ID transmitted from the host apparatus with the permitted host ID stored in the storing step and of determining whether the association process is performed in the processing step based on a result of the comparison when the association process is performed in the processing step.

Accordingly, a third aspect of the present invention provides a computer-readable storage medium storing a control program causing a computer to execute a control method for an image processing apparatus that is possible to perform wireless communication with a host apparatus to receive data from the host apparatus, the control method comprising a processing step of performing an association process with the host apparatus in order to perform the wireless communication, a storing step of storing a permitted host ID indicating the host apparatus that is permitted to perform the association process in the processing step, and a control step of comparing a host ID transmitted from the host apparatus with the permitted host ID stored in the storing step and of determining whether the association process is performed in the processing step based on a result of the comparison when the association process is performed in the processing step.

According to the present invention, an unauthorized connection from a host apparatus that is not permitted to use a device can be prevented by restricting a host apparatus that performs the association process by the method other than the password authentication.

Further features of the present invention will become apparent from the following description of exemplary embodiments with reference to the attached drawings.

BRIEF DESCRIPTION OF THE DRAWINGS

FIG. 6 is a view showing an example of an association permission ID list.

FIG. 7 is a view showing an example of a CC list.

FIG. 8 is a view showing an example of a manager list.

FIG. 10 is a view showing a screen example displayed on a display device of the host PC.

FIG. 11 is a view showing an example of a selecting screen displayed on the display device of the host PC.

FIG. 12 is a view showing an example of a screen for editing the association permission ID list displayed on the display device of the host PC.

FIG. 13 is a view showing an example of a screen for editing the manager list displayed on the display device of the host PC.

FIG. 16 is view showing an example of an error notification outputted from a printer of the image processing apparatus.

FIG. 17 is a view showing an example of an association permission ID list to which a field for a flag that represents completion of the association process is added in an image processing apparatus according to a third embodiment of the present invention.

FIG. 20 is a view showing an example of a confirmation screen displayed on the display device of the host PC when editing the association permission ID list.

FIG. 21 is a view showing an example of the confirmation screen displayed on the display device of the host PC when editing the manager list.

DESCRIPTION OF THE EMBODIMENTS

Hereafter, embodiments according to the present invention will be described in detail with reference to the drawings.

Figure 1:
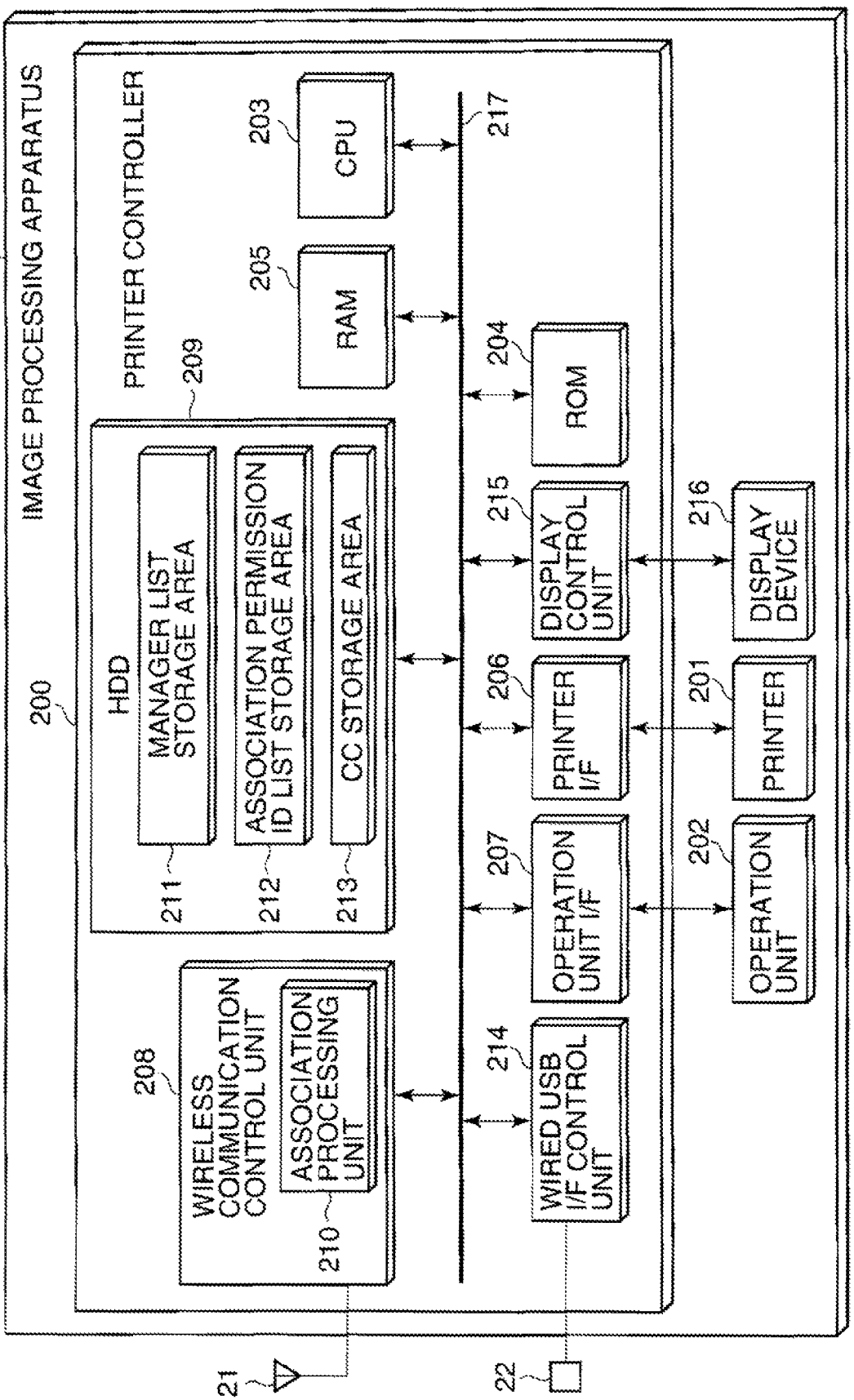
FIG. 1 is a block diagram schematically showing a configuration example of an image processing apparatus according to a first embodiment of the present invention.

FIG. 1 is a block diagram schematically showing a configuration example of an image processing apparatus 20 according to a first embodiment of the present invention.

Figure 2:
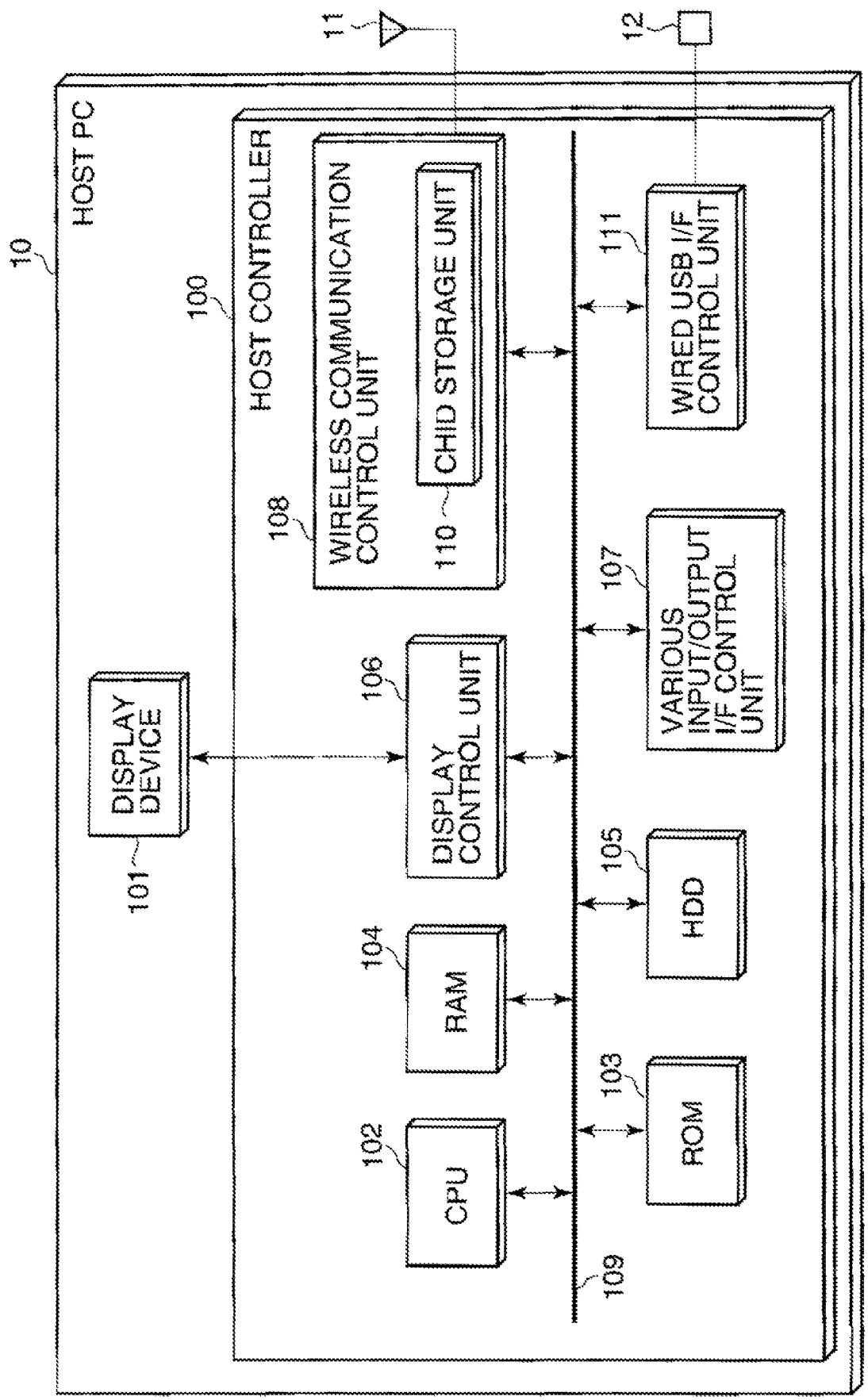
FIG. 2 is a block diagram schematically showing a configuration example of a host PC.

As shown in FIG. 1, the image processing apparatus 20 of this embodiment is provided with a printer controller 200, an operation unit 202, a printer 201, and a display device 216, and performs a wireless USB communication with a host PC 10 shown in FIG. 2.

The printer controller 200 is provided with a CPU 203, a ROM 204, a RAM 205, a printer I/F 206, an operation unit I/F 207, a wireless communication control unit 208, a hard disk drive 209, a wired USB I/F control unit 214, and a display-control unit 215, which are arranged on a system bus 217.

The CPU 203 controls the whole system. The ROM 204 is a boot ROM that stores a boot program of the system. The RAM 205 is a system work memory for an operation of the CPU 203, and is also an image memory for temporarily storing image data such as print data transmitted from the host PC 10 shown in FIG. 2.

The printer I/F 206 is connected to the printer 201 to communicate with a CPU of the printer 201. The printer I/F 206 converts image data between a synchronous system and an asynchronous system. The operation unit I/F 207 is an interface unit of the operation unit 202, and outputs image data displayed on the operation unit 202 to the operation unit 202. The operation unit I/F 207 outputs information inputted from the operation unit 202 by a user to the CPU 203.

The wireless communication control unit 208 controls the wireless USB communication via the wireless USB antenna 21, when there is the host PC 10 that performs the wireless USB communication at external devices.

The HDD 209 has a manager list storage area 211, an association permission ID list storage area 212, and a CC (connection context) storage area 213.

The association permission ID list storage area 212 is a storage area that stores a permitted host ID that specifies a host PC to which execution of an association process is permitted. The host ID transmitted from the host PC 10 is received via the wireless USB antenna 21 and the wireless communication control unit 208, and is compared with the host ID included in the CC in the CC storage area 213 by the CPU 203.

The CPU 203 determines whether the CC including the host ID identical to the host ID transmitted from the host PC 10 is stored in the CC storage area 213. When there is the CC including the identical host ID, the CPU 203 establishes the wireless USB communication between the image processing apparatus 20 and the host PC 10.

On the other hand, when the CC including the host ID identical to the host ID transmitted from the host PC 10 is not stored in the CC storage area 213, the CPU 203 determines whether the permitted host ID identical to the host ID transmitted from the host PC 10 is stored in the association permission ID list storage area 212. Then, the CPU 203 performs the association process by the association processing unit 210, when the host ID transmitted from host PC 10 matches the permitted host ID in the association permission ID list storage area 212.

Moreover, the CPU 203 does not perform the association process by the association processing unit 210, when the host ID transmitted from host PC 10 does not match the permitted host ID in the association permission ID list storage area 212.

The manager list storage area 211 stores a manager host ID that specifies the host PC having a authority to edit list information of the association permission ID list storage area 212. When editing the list information in the association permission ID list storage area 212, the CPU 203 compares the host ID transmitted from the host PC and the manager host ID in the manager list storage area 211. Then, the CPU 203 permits the host PC 10 to edit the list information in the association permission ID list storage area 212, only when the host ID transmitted from the host PC matches the manager host ID in the manager list storage area 211.

The wired USB I/F control unit 214 controls wired USB communication with the external devices via a USB connection port 22. It should be noted that the wired USB I/F control unit 214 is used in a cable association process, but is not necessary when the cable association process is not supported.

The display control unit 215 outputs numeric values etc. that are displayed on the display device 216 to the display device 216. It should be noted that the display device 216 is used in a numeric association process, but is not necessary when the numeric association process is not supported.

Next, a configuration example of the host PC 10 will be described with reference to FIG. 2.

As shown in FIG. 2, the host PC 10 is provided with a host controller 100. A display device 101 and input devices (not shown) such as a keyboard and a mouse are connected to the host controller 100.

The host controller 100 is provided with a CPU 102, a ROM 103, a RAM 104, a HDD 105, a display control unit 106, a various input/output I/F control unit 107, a wireless communication control unit 108, and a wired USB I/F control unit 111, which are arranged on a system bus 109.

The CPU 102 controls the whole system. The ROM 103 is a boot ROM that stores a boot program of the system. The RAM 104 is a system work memory for an operation of the CPU 102, and is also an image memory for temporarily storing image data such as print data. The HDD 105 stores system software and image data.

The display control unit 106 outputs the image data that is displayed on the display device 101 to the display device 101. The various input/output I/F control unit 107 is a control section for input/output interfaces such as the keyboard and the mouse (not shown).

The wired USB I/F control unit 111 controls wired USB communication with the external devices via a USB connection port 12. The wired USB I/F control unit 111 is used for the cable association, and is also used as a control unit for a communication network (not shown) such as a LAN.

The wireless communication control unit 108 is provided with a CHID storage unit 110 that stores the host ID (CHID), and controls the wireless USB communication via a host-side wireless USB antenna 11, when there is the image processing apparatus that performs the wireless USB communication at the external devices.

Next, an example of the cable association process by the wired communication using a USB cable will be described with reference to FIG. 3A.

First, after the host PC 10 and the image processing apparatus 20 are connected by the USB cable, the host PC 10 checks that the image processing apparatus 20 supports a CBAF (Cable-Based Association Framework) (11).

Next, the host PC 10 checks that the image processing apparatus 20 supports the wireless USB communication (WUSB) using the CBAF (12).

Next, the host PC 10 transmits its own host ID (CHID) stored in the CHID storage unit 110 of the wireless communication control unit 108 to the image processing apparatus 20 (13).

The image processing apparatus 20 transmits the device ID (CDID) corresponding to the received CHID to the host PC 10 (14). That is, the image processing apparatus 20 retrieves the CC including the received CHID from the CC storage area 213 of the HDD 209. When the CC including the received CHID is not stored in the CC storage area 213, the image processing apparatus 20 transmits a device ID (CDID) of "0" to the host PC 10. On the other hand, when the CC including the received CHID is stored in the CC storage area 213, the image processing apparatus 20 determines that the association process has completed, and transmits the CDID included in the CC to the host PC 10 without performing the association process.

The host PC 10 transmits the CC corresponding to the CDID, which is received from the image processing apparatus 20, to the image processing apparatus 20 (15). That is, when the CDID received from the image processing apparatus 20 is "0", the host PC 10 generates a new CC, saves the generated CC into its own HDD 105, and transmits the generated CC to the image processing apparatus 20. On the other hand, when the CC including the CDID received from the image processing apparatus 20 is stored in the HDD 105 as a result of retrieval, the host PC 10 updates a connection key (CK) included in the CC, and transmits the updated CC to the image processing apparatus 20.

Next, an example of the numeric association process by wireless communication will be described with reference to FIG. 3B.

First, when a user operates the image processing apparatus 20 to instruct an execution of the association process, the image processing apparatus 20 transmits a request to acquire the host ID by broadcast. Receiving the acquisition request, the host PC 10 transmits the host ID (CHID) to the image processing apparatus 20 by a broadcasting wireless signal (21).

The image processing apparatus 20 retrieves the CC including the received CHID from the CC storage area 213. When the CC including the received CHID is not stored in the CC storage area 213, the image processing apparatus 20 transmits an association request and the CDID to the host PC 10 by the wireless signal (22).

Receiving the association request, the host PC 10 transmits an association permission response to the image processing apparatus 20 by the wireless signal (23).

Since the host PC 10 needs to perform encryption communication in order to transmit the generated CC to the image processing apparatus 20, the host PC 10 and the image processing apparatus 20 exchange an encryption key to each other, and prepare the encryption communication (24). This encryption communication is different from the encryption communication of the regular wireless USB communication.

When the encryption communication is ready, the same value is displayed on the display device 101 of the host PC 10 and the display device 216 of the image processing apparatus 20. If the same value is displayed, the host PC 10 transmits the generated CC (25) by the encryption communication prepared in the stage (24). As a result of these processes, the host PC 10 and the image processing apparatus 20 have the same CC.

Figure 4:
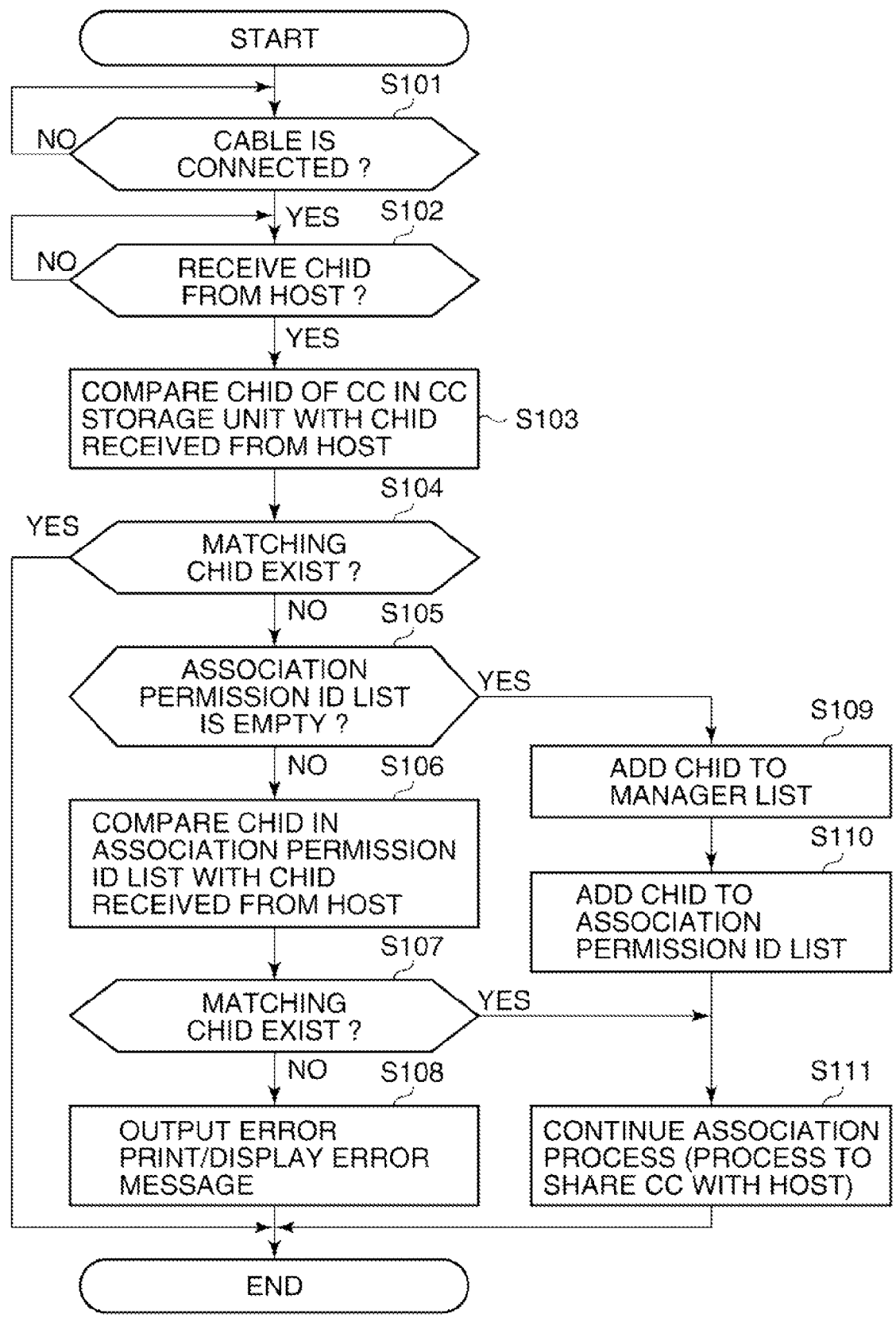
FIG. 4 is a flowchart showing an example of the cable association process in the image processing apparatus.

Next, an example of the cable association process in the image processing apparatus 20 will be specifically described with reference to FIG. 4. It should be noted that each process in FIG. 4 is achieved by loading a control program stored in the ROM 204, the HDD 209 or the like of the image processing apparatus 20 onto the RAM 205 and by executing the program by the CPU 203.

In step S101, the CPU 203 determines whether the USB connection port 12 of the host PC 10 and the USB connection port 22 of the image processing apparatus 20 are wire-connected by the USB cable. When they are wire-connected, the process proceeds to step S102. At this time, the host PC 10 checks that the image processing apparatus 20 supports the CBAF via the wired USB I/F control unit 214, and checks that the image processing apparatus 20 can establish the wireless USB communication.

In the step S102, the CPU 203 determines whether the CHID is received via the wired cable from the host PC 10. When the CHID is received, the process proceeds to step S103.

In the step S103, the CPU 203 retrieves the CC having the CHID that matches the received CHID from the CC storage area 213, and proceeds with the process to step S104.

In the step S104, the CPU 203 determines whether the matching CC has been found in the retrieval in the step S103. The CPU 203 finishes the association process when the matching CC has been found, or proceeds with the process to step S105 when the matching CC has not been found.

In the step S105, the CPU 203 determines whether the association permission ID list storage area 212 is in an empty condition (no permitted host ID exists). The CPU 203 proceeds with the process to step S106 when the permitted host ID exists in the association permission ID list storage area 212, or proceeds with the process to step S109 when no permitted host ID exists.

In the step S106, the CPU 203 compares the permitted host ID in the association permission ID list storage area 212 with the received host ID (CHID), and proceeds with the process to step S107.

In the step S107, the CPU 203 determines whether the CHID that matches the received CHID exists in the association permission ID list storage area 212 as a result of the retrieval in step S106. The CPU 203 proceeds with the process to step S108 when the matching CHID does not exist, or to step S111 when the matching CHID exists.

In the step S108, the CPU 203 outputs an error print indicating that the association process cannot be executed from the printer 201, and finishes the process. It should be noted that the CPU 203 may display an error message on the display device 216 or may display an error message on the display device 101 of the host PC 10 by an instruction via the wired USE communication, instead of the output of the error print.

On the other hand, in the step S109, the CPU 203 stores the received CHID into the manager list storage area 211 of the HDD 209, and proceeds with the process to step S110.

In the step S110, the CPU 203 stores the CHID stored in the manager list storage area 211 into the association permission ID list storage area 212, and proceeds with the process to the step S111.

Figure 3A:
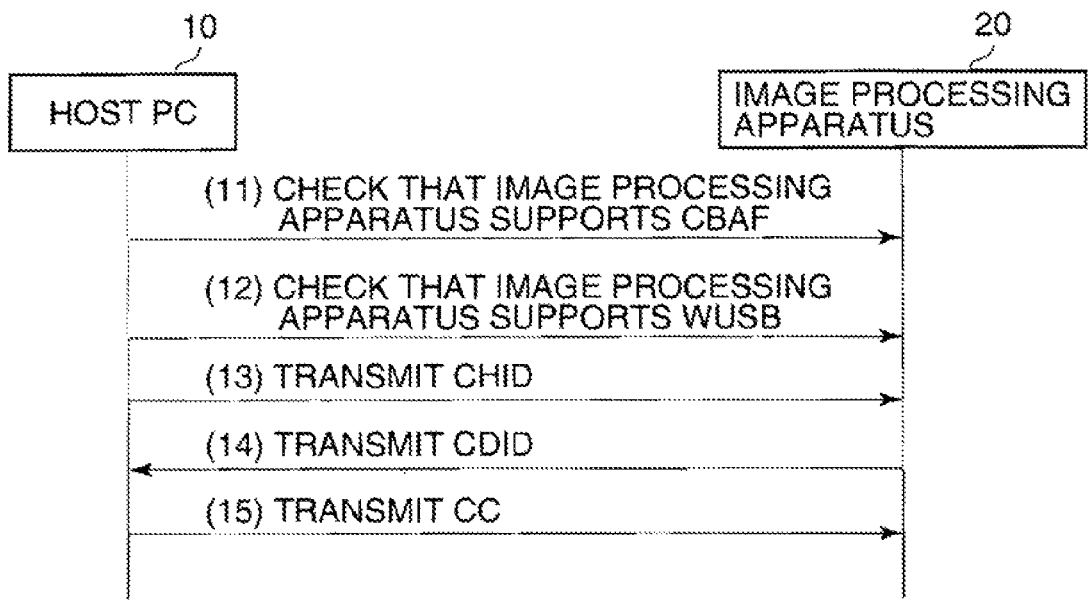
FIG. 3A is a schematic view showing an example of a cable association process using a USB cable.

In the step S111, after transmitting the CDID to the host PC 10 (corresponding to (14) in FIG. 3A), the CPU 203 receives the CC that is generated by the host PC 10, and stores the received CC into the CC storage area 213 of the HDD 209. Accordingly, the host PC 10 and the image processing apparatus 20 have the same CC, and the cable association process is finished.

Figure 5:
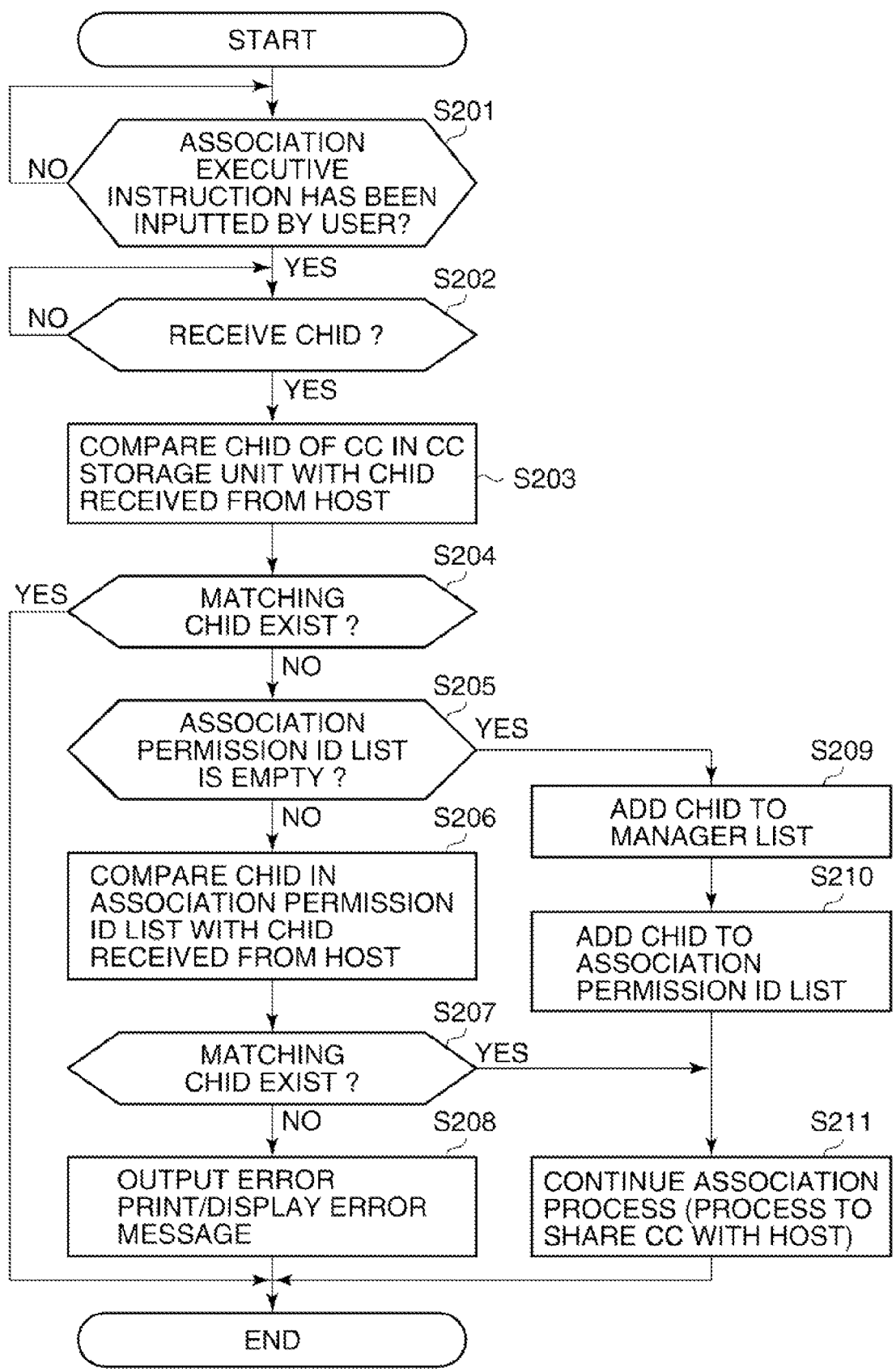
FIG. 5 is a flowchart showing an example of the numeric association process in the image processing apparatus.

Next, an example of the numeric association process in the image processing apparatus 20 will be specifically described with reference to FIG. 5. It should be noted that each process in FIG. 5 is achieved by loading a control program stored in the ROM 204, the HDD 209 or the like of the image processing apparatus 20 onto the RAM 205 and by executing the program by the CPU 203.

In step S201, the CPU 203 determines whether an association executive instruction has been inputted by a user from the operation unit 202. When the instruction has been inputted, the process proceeds to step S202.

In the step S202, the CPU 203 determines whether the CPU 203 has received the CHID stored in the CHID storage unit 110 of the host PC 10 from the host PC 10 concerned. When the CHID has been received, the process proceeds to step S203. It should be noted that the received CHID may be stored in the RAM 205 when the CHID is received from the host PC 10 before the step S201.

In the step S203, the CPU 203 compares the received CHID with the CHID of the CC stored in the CC storage area 213, and proceeds with the process to step S204.

In the step S104, the CPU 203 determines whether the received CHID matches the CHID of the CC stored in the CC storage area 213 as a result of the comparison in the step S203. The CPU 203 finishes the association process when the CHIDs are matched, or proceeds with the process to step S205 when the CHIDs are not matched.

In the step S205, the CPU 203 determines whether the association permission ID list storage area 212 is in an empty condition (no permitted host ID exists). The CPU 203 proceeds with the process to step S206 when the permitted host ID exists in the association permission ID list storage area 212, or proceeds with the process to step S209 when no permitted host ID exists.

In the step S206, the CPU 203 compares the permitted host ID in the association permission ID list storage area 212 with the received host ID (CHID), and proceeds with the process to step S207.

In the step S207, the CPU 203 determines whether the CHID in the association permission ID list storage area 212 matches the received CHID as a result of the comparison in the step S206. The CPU 203 proceeds with the process to step S208 when the CHIDs are not matched, or to step S211 when the CHIDs are matched.

In the step S208, the CPU 203 outputs an error print indicating that the association process cannot be executed from the printer 201, and finishes the process. It should be noted that an error message may be displayed on the display device 216 instead of outputting the error print.

On the other hand, in the step S209, the CPU 203 stores the received CHID into the manager list storage area 211 of the HDD 209, and proceeds with the process to step S210.

In the step S210, the CPU 203 stores the CHID stored in the manager list storage area 211 into the association permission ID list storage area 212, and proceeds with the process to the step S211.

Figure 3B:
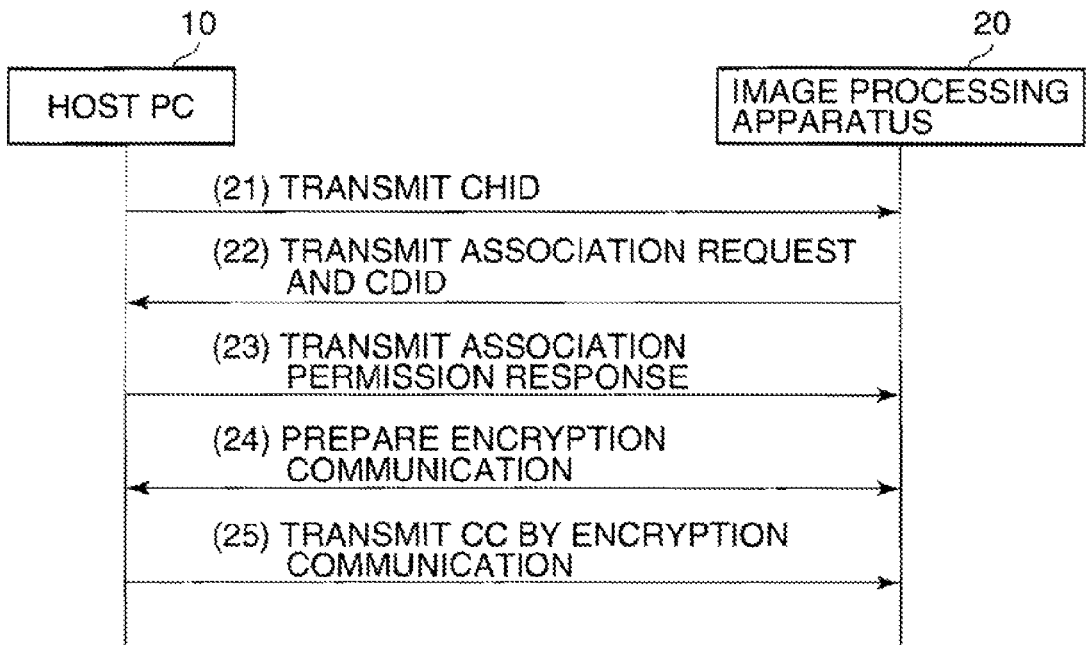
FIG. 3B is a schematic view showing an example of a numeric association process by wireless communication.

In the step S211, the CPU 203 transmits a new connection request to the host PC 10 by the wireless communication (corresponding to (22) in FIG. 3B). Then, the host PC 10 and the image processing apparatus 20 prepare the encryption communication. After the preparation is completed, the CPU 203 receives the CC that is generated by the host PC 10 and stores the received CC into the CC storage area 213 of the HDD 209. Accordingly, the host PC 10 and the image processing apparatus 20 have the same CC, and the numeric association process is finished.

FIG. 6 is a view showing an example of an association permission ID list stored in the association permission ID list storage area 212 of the HDD 209 of image processing apparatus 20.

When the CHID in the association permission ID list matches the CHID received from the host PC 10, the association process is performed between the host PC 10 and the image processing apparatus 20, and the common CC is owned. When the common CC is owned, the host PC 10 becomes possible to perform the wireless connection to the image processing apparatus 20. It should be noted that a host name in the association permission ID list in FIG. 6 can be arbitrarily set by the user when editing the association permission ID list. A number or a computer name of the host PC may be set in an initial condition.

FIG. 7 is a view showing an example of a CC list stored in the CC storage area 213 of the HDD 209 of the image processing apparatus 20.

When there is a CC including the received CHID in the CC list in the CC storage area 213, since the association process is already completed, it is not necessary to generate a new CC, but a connection key of the CC is updated and the updated CC is shared between the host PC 10 and the image processing apparatus 20.

FIG. 8 is a view showing an example of the manager list stored in the manager list storage area 211 in the HDD 209 of the image processing apparatus 20.

When no CHID is listed in the association permission ID list shown in FIG. 6, the host PC 10 that has been connected first is added to the association permission ID list shown in FIG. 6 and the manager list shown in FIG. 8. When contents in the association permission ID list and contents in the manager list are edited (addition, deletion), the manager list needs to have the CHID of the host PC 10 that is operated for editing.

As described above, in this embodiment, only the host PC 10 having the CHID that is listed in the association permission ID list performs the association process, and when the host PC 10 and the image processing apparatus 20 have the same CC, the connection by the wireless USB communication becomes possible.

Even if the host PC 10 having the CHID that is not listed in the association permission ID list tries to perform the association process, the image processing apparatus 20 refuses the association process, and the host PC 10 cannot perform the connection process. As a result, since the host PC 10 that is not listed in the association permission ID list cannot use the image processing apparatus 20, a use of the image processing apparatus 20 by an unauthorized person can be prevented without authenticating a password.

Figure 9:
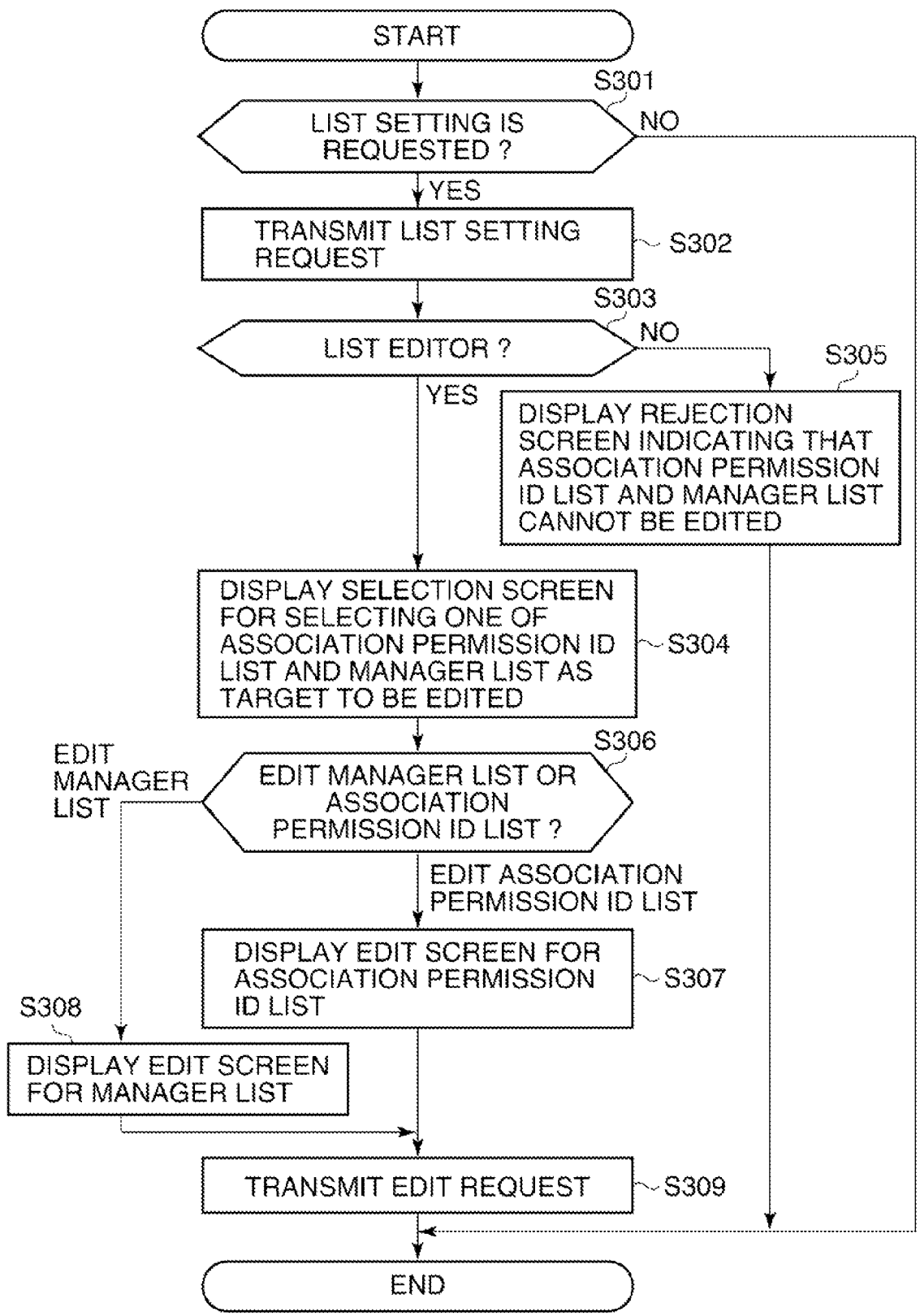
FIG. 9 is a flowchart showing an example of a process of the host PC when editing the association permission ID list and the manager list.

Next, an example of a process of the host PC when editing the association permission ID list and the manager list will be described with reference to FIG. 9. It should be noted that each process in FIG. 9 is achieved by loading a control program stored in the ROM 103, the HDD 105 or the like of the host PC 10 onto the RAM 104 and by executing the program by the CPU 102.

In step S301, the CPU 102 determines whether a list setting request by a user's operation etc. is received. When the list setting request is received, the process proceeds to step S302. It should be noted that the edit of the association permission ID list and the manager list is finished when the received request is not the list setting request but is a print execution request etc., for example.

In the step S302, the CPU 102 transmits the list setting request to the image processing apparatus 20, and proceeds with the process to step S303.

In the step S303, the CPU 102 determines whether the CHID of this host PC 10 exists in the manager list of the image processing apparatus 20 based on the information received from the image processing apparatus 20. When the CHID of this host PC 10 exists in the manager list, the CPU 102 proceeds with the process to step S304. When the CHID of this host PC 10 does not exist, the CPU 102 proceeds with the process to step S305.

In the step S305, the CPU 102 displays a rejection screen indicating that the association permission ID list and the manager list cannot be edited as shown in FIG. 10 on the display device 101, for example, and finishes the process.

In the step S304, the CPU 102 displays a selection screen for selecting one of the association permission ID list and the manager list as a target to be edited as shown in FIG. 11 on the display device 101 in order to urge the user to select, and proceeds with the process to step S306.

In the step S306, the CPU 102 determines which is selected as the target to be edited between the manager list and the association permission ID list in the selection screen displayed in the step S304. When the edit of the manager list is selected, the process proceeds to step S308, or when the edit of the association permission ID list is selected, the process proceeds to step S307.

In the step S307, the CPU 102 displays an edit screen for the association permission ID list as shown in FIG. 12 on the display device 101. When an OK button is pushed after the edit by the user, the process proceeds to step S309.

In the step S308, the CPU 102 displays an edit screen for the manager list as shown in FIG. 13 on the display device 101. When an OK button is pushed after the edit by the user, the process proceeds to the step S309.

In the step S309, the CPU 102 transmits an edit request to the image processing apparatus 20, and finishes the process.

Figure 14:
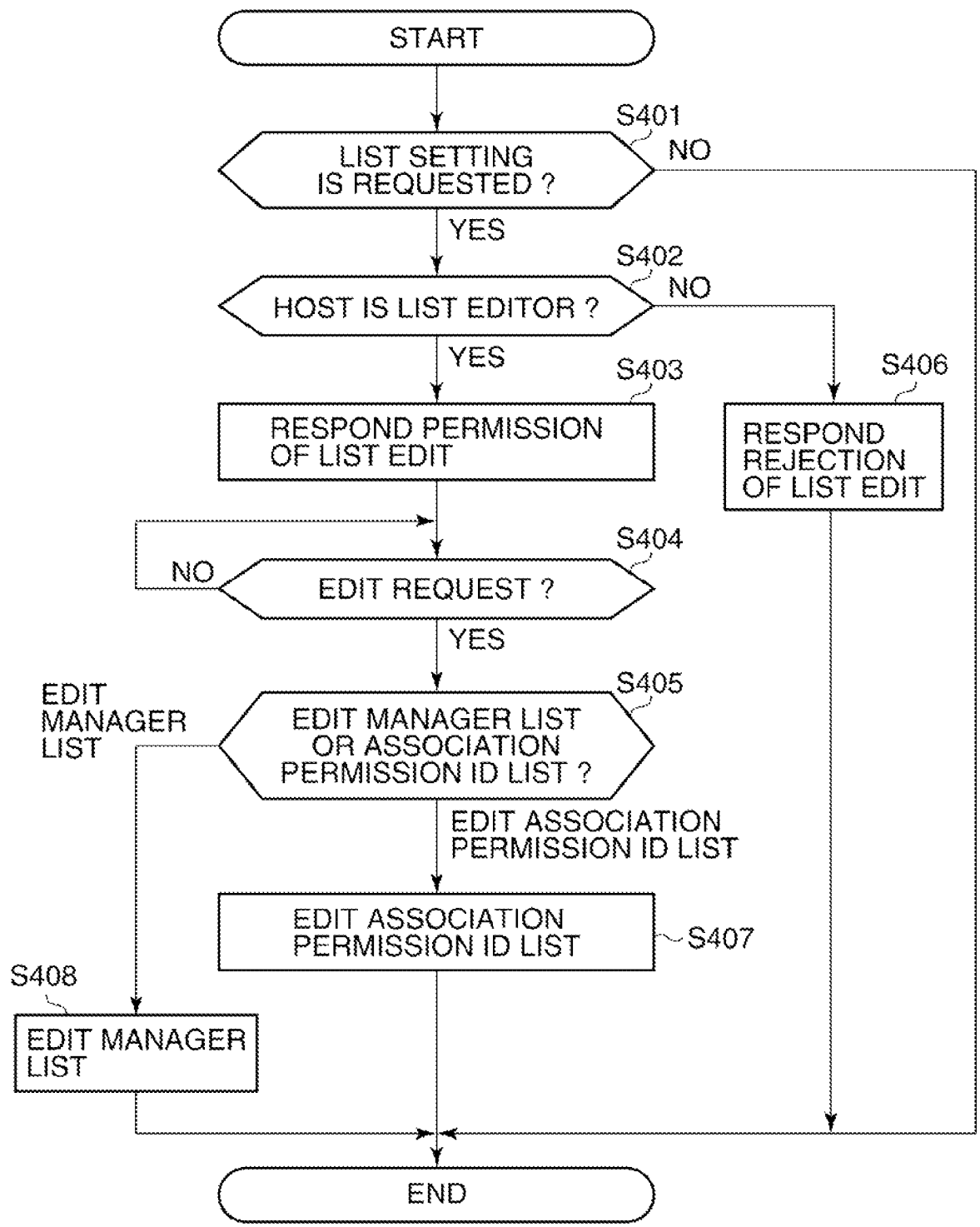
FIG. 14 is a flowchart showing an example of a process of the image processing apparatus when editing the association permission ID list and the manager list.

Next, an example of a process of the image processing apparatus 20 when editing the association permission ID list and the manager list will be described with reference to FIG. 14. It should be noted that each process in FIG. 14 is achieved by loading a control program stored in the ROM 204, the HDD 209 or the like of the image processing apparatus 20 onto the RAM 205 and by executing the program by the CPU 203.

In step S401, the CPU 203 determines whether a list setting request has received from the host PC 10. When receiving the list setting request, the CPU 203 proceeds with the process to step S402. When not receiving the list setting request, the CPU 203 finishes the process for editing the association permission ID list and the manager list.

In the step S402, the CPU 203 determines whether this host PC 10 has the authority to edit the lists by searching the manager list storage area 211 in the HDD 209 for the CHID of the host PC 10 that has transmitted the list setting request. Then, the CPU 203 proceeds with the process to step S403 when the CHID matching the CHID of the host PC 10 exists in the manager list storage area 211. When the matching CHID does not exist, the CPU 203 proceeds with the process to step S406.

In the step S406, since the list setting request is transmitted from the host PC 10 having the CHID that does not exist in the manager list, the CPU 203 notifies the host PC 10 that the authority to edit the association permission ID list and the manager list is not given, and finishes the process.

In the step S403, since the list setting request is transmitted from the host PC 10 having the CHID that exists in the manager list, the CPU 203 notifies the host PC 10 that the authority to edit the association permission ID list and the manager list is given (edit is permitted), and proceeds with the process to step S404.

In the step S404, the CPU 203 determines whether the edit request (corresponding to step S309 in FIG. 9) is received from the host PC 10. When the edit request is received, the process proceeds to step S405. When the edit request is not received, the CPU 203 waits until receiving an edit request.

When receiving the edit request from the host PC 10, the CPU 203 determines which of the association permission ID list and the manager list is an editing target in step S405. When the manager list is the editing target, the process proceeds to step S408, or when the association permission ID list is the editing target, the process proceeds to step S407.

In the step S408, the CPU 203 reflects contents of the received edit request to the manager list in the manager list storage area 211 of the HDD 209, and finishes the process.

In the step S407, the CPU 203 reflects the received edit request to the association permission ID list in the association permission ID list storage area 212 of the HDD 209, and finishes the process.

As described above, in this embodiment, the authority to edit the association permission ID list is given to only the host PC 10 of which the CHID is listed in the manager list. Thus, a use of the image processing apparatus 20 by an unauthorized person can be prevented by limiting the host PC 10 to which the authority to edit the association permission ID list and the manager list is given.

Next, an image processing apparatus according to a second embodiment of the present invention will be described with reference to FIG. 15 and FIG. 16. It should be noted that duplicated sections or corresponding sections with respect to the above-mentioned first embodiment will be described by diverting the reference numerals etc.

Figure 22:
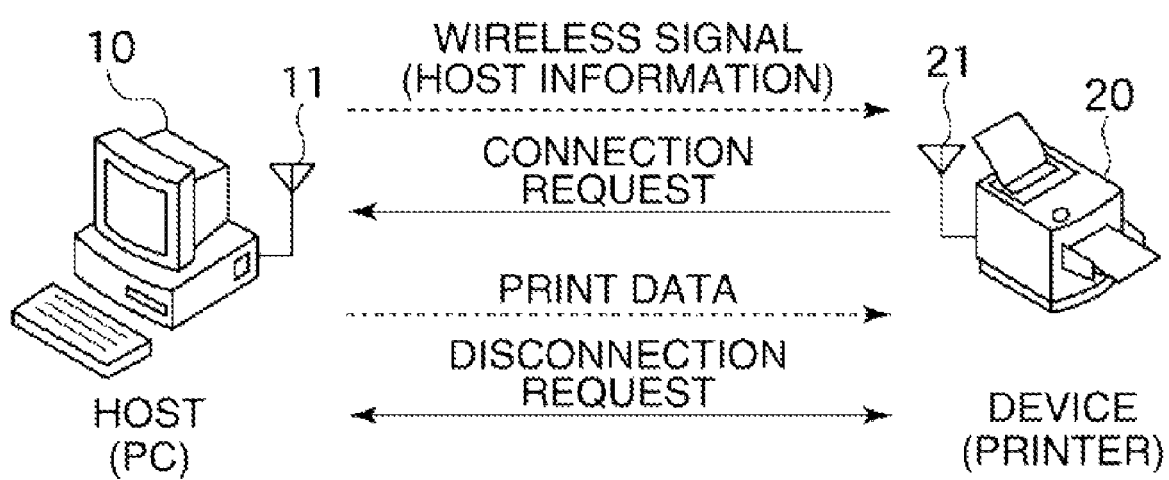
FIG. 22 is a schematic view showing a system example that performs wireless USB communication between a host apparatus and a device.

The image processing apparatus 20 of the above-mentioned first embodiment retrieves the CHID received from the host PC 10 from the CC list using the "wireless signal" in FIG. 22, and determines whether the "connection request" in FIG. 22 is performed to the host PC 10 based on the CC list. On the other hand, the image processing apparatus 20 of this embodiment retrieves an association permission ID list to determine whether the "connection request" in FIG. 22 is performed to the host PC 10 after retrieving a CHID received from the host PC 10 from the CC list.

Figure 15:
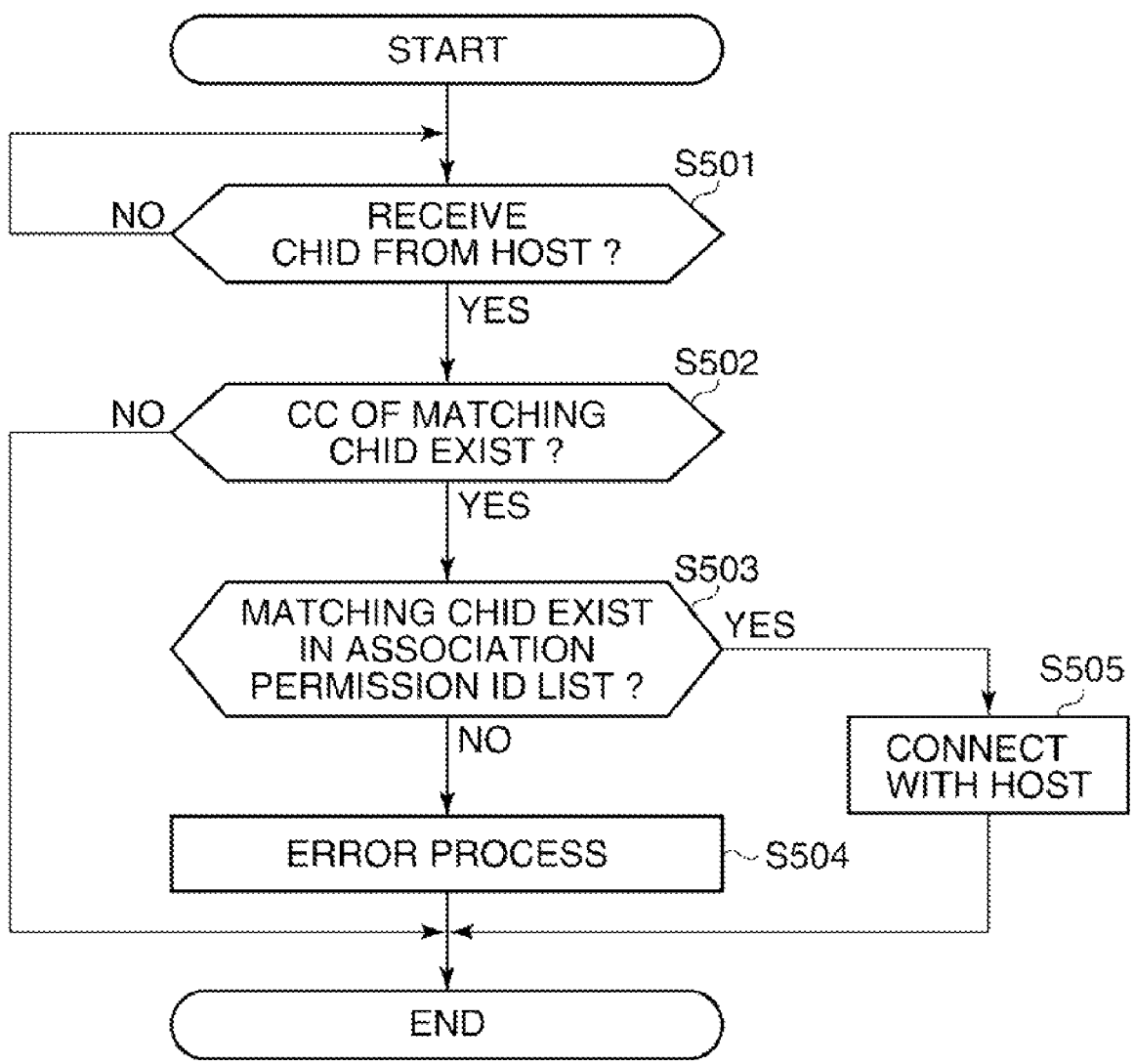
FIG. 15 is a flowchart showing an example of a process of an image processing apparatus according to a second embodiment of the present invention.

FIG. 15 is a flowchart showing an example of a process in the image processing apparatus 20. Each process in FIG. 15 is achieved by loading a control program stored in the ROM 204, the HDD 209 or the like of the image processing apparatus 20 onto the RAM 205 and by executing the program by the CPU 203.

In step S501, the CPU 203 determines whether the CHID is received from the host PC 10. When the CHID is received, the process proceeds to step S502.

In the step S502, the CPU 203 determines whether a CC of the CHID that matches the received CHID exists in the CC storage area 213 of the HDD 209. When the CC of the CHID that matches the received CHID exists in the CC storage area 213, the CPU 203 proceeds with the process to step S503. When it does not exist, the CPU 203 cancels the received CHID and finishes the process.

In the step S503, the CPU 203 determines whether the CHID that matches the received CHID exists in the association permission ID list storage area 212 of the HDD 209. The CPU 203 proceeds with the process to step S505, when the CHID that matches the received CHID exists in the association permission ID list storage area 212. When it does not exist, the process proceeds to step S504. The process here can prevent a host PC, which completed the association process once but was deleted from the association permission ID list by another host PC listed in the manager list, from connecting to the image processing apparatus 20.

In the step S504, as shown in FIG. 16, the CPU 203 outputs an error print indicating that the host PC trying to connect to the image processing apparatus 20 was deleted from the association permission ID list from the printer 201, and finishes the process. It should be noted that an error message indicating that the host PC trying to connect to the image processing apparatus 20 was deleted from the association permission ID list may be displayed on the display device 216 instead of outputting the error print from the printer 201.

In the step S505, the CPU 203 checks that the host PC 10 and the image processing apparatus 20 have the same CC, performs the connection process of the host PC, and finishes the process. The other configurations and operation effects are the same as that of the above-mentioned first embodiment.

Next, an image processing apparatus according to a third embodiment of the present invention will be described with reference to FIG. 17 through FIG. 21. It should be noted that duplicated sections or corresponding sections with respect to the above-mentioned first embodiment will be described by diverting the reference numerals etc.

In a description of an image processing apparatus 20 of this embodiment, an editing process for the association permission ID list and the manager list in a case of deleting a CHID of a host PC that completed the association process from the association permission ID list will be described.

FIG. 17 is a view showing the association permission ID list that is formed by adding flags (circular marks in FIG. 17) in fields of host PCs that completed the association process to the association permission ID list shown in FIG. 6.

Figure 18:
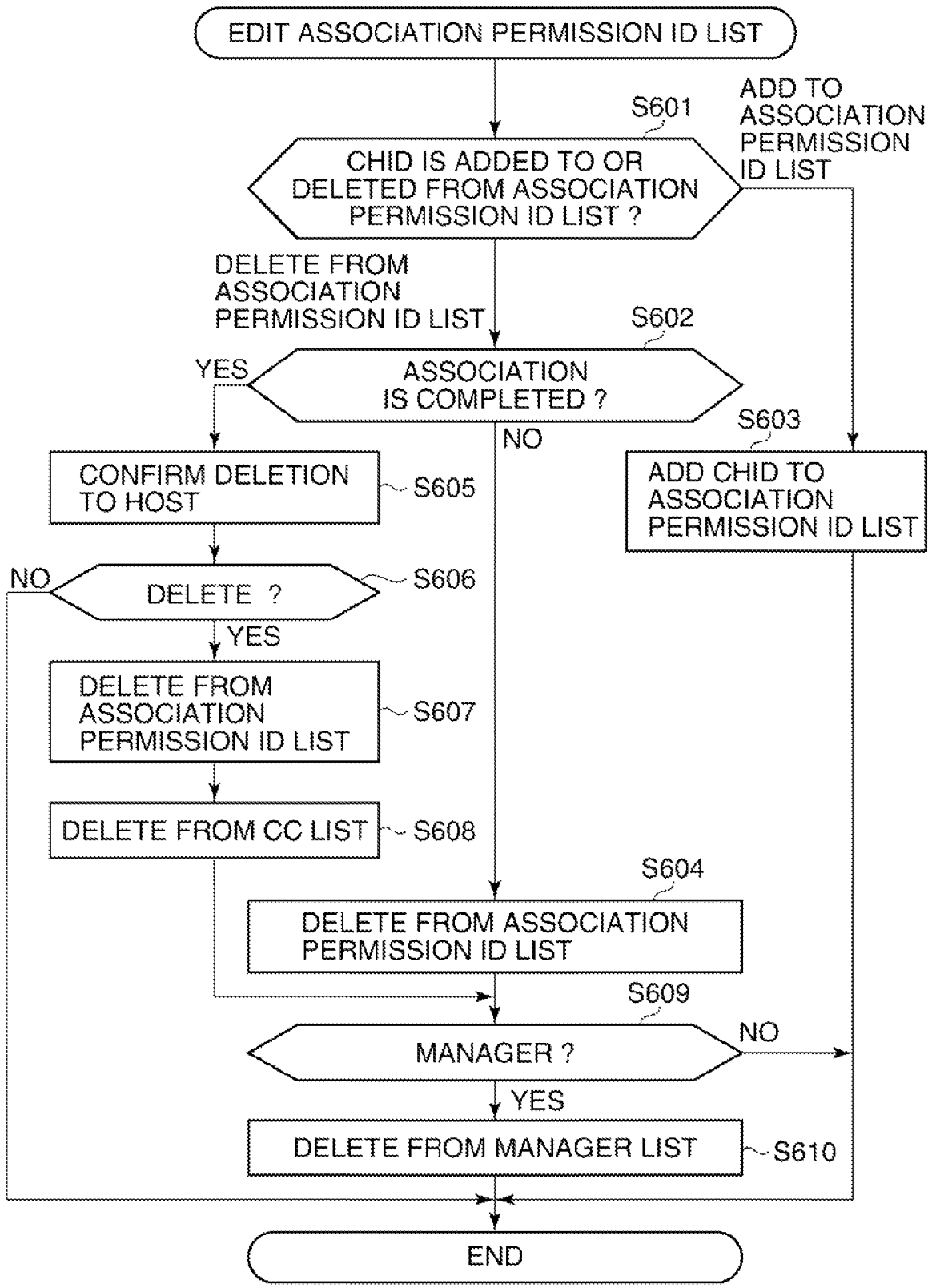
FIG. 18 is a flowchart showing an example of a process of the image processing apparatus when editing the association permission ID list in step S405 in FIG. 14.

FIG. 18 is a flowchart showing an example of a process of the image processing apparatus 20 when editing the association permission ID list in the step S405 in FIG. 14. Each process in FIG. 18 is achieved by loading a control program stored in the ROM 204, the HDD 209 or the like of the image processing apparatus 20 onto the RAM 205 and by executing the program by the CPU 203.

In step S601, the CPU 203 determines whether the CHID received from the host PC 10 is added to or deleted from the association permission ID list. When the CHID is added, the process proceeds to step S603. When the CHID is deleted, the process proceeds to step S602.

In the step S603, the CPU 203 adds the CHID received from the host PC 10 to the association permission ID list in the association permission ID list storage area 212, and finishes the process.

In the step S602, the CPU 203 determines whether the host PC 10 having the CHID to be deleted completed the association process with reference to the association permission ID list shown in FIG. 17 in which the flags are added to the host PCs that completed the association process. Then, the CPU 203 proceeds with the process to step S605, when the host PC 10 having the CHID to be deleted completed the association process. When the host PC 10 having the CHID to be deleted did not complete the association process, the CPU 203 proceeds with the process to step S604.

In the step S604, the CPU 203 deletes the CHID of the host PC 10 from the association permission ID list in the association permission ID list storage area 212, and proceeds with the process to step S609.

In the step S605, the CPU 203 outputs a display instruction of a confirmation screen from the printer 201 to the host PC 10, displays the confirmation screen shown in FIG. 20, for example, on the display device 101 of the host PC 10, and proceeds with the process to step S606. If a CHID of a host PC that completed the association process once is deleted from the association permission ID list, it becomes impossible to connect. Thus, the process here is performed to urge a user of the host PC to confirm.

In the step S606, the CPU 203 determines whether the user pushed an OK button (to delete) or a cancel button (not to delete) in the confirmation screen on the display device 101 of the host PC 10 shown in FIG. 20. When an operation signal of the OK button is received, the process proceeds to step S607. When an operation signal of the cancel button is received, the process is finished.

In the step S607, the CPU 203 deletes the CHID of the host PC concerned from the association permitted host ID list in the association permission ID list storage area 212, and proceeds with the process to step S608.

In the step S608, the CPU 203 deletes the CC including the CHID of the host PC 10 deleted in the step S607 from the CC storage area 213, and proceeds with the process to the step S609. The deletion of the CC prevents the host PC deleted from the association permission ID list from connecting with the image processing apparatus 20.

In the step S609, the CPU 203 determines whether the deleted host PC 10 is listed in the manager list. When the deleted host PC 10 is listed in the manager list, the process proceeds to step S610. When the deleted host PC 10 is not listed in the manager list, the process is finished.

In the step S610, the CPU 203 deletes the CHID of the host PC 10 to be deleted from the manager list in the manager list storage area 211, and finishes the process. The process here is performed to resolve a contradiction where the CHID of the host PC 10 to be deleted is not listed in the association permission ID list but is listed in the manager list.

Figure 19:
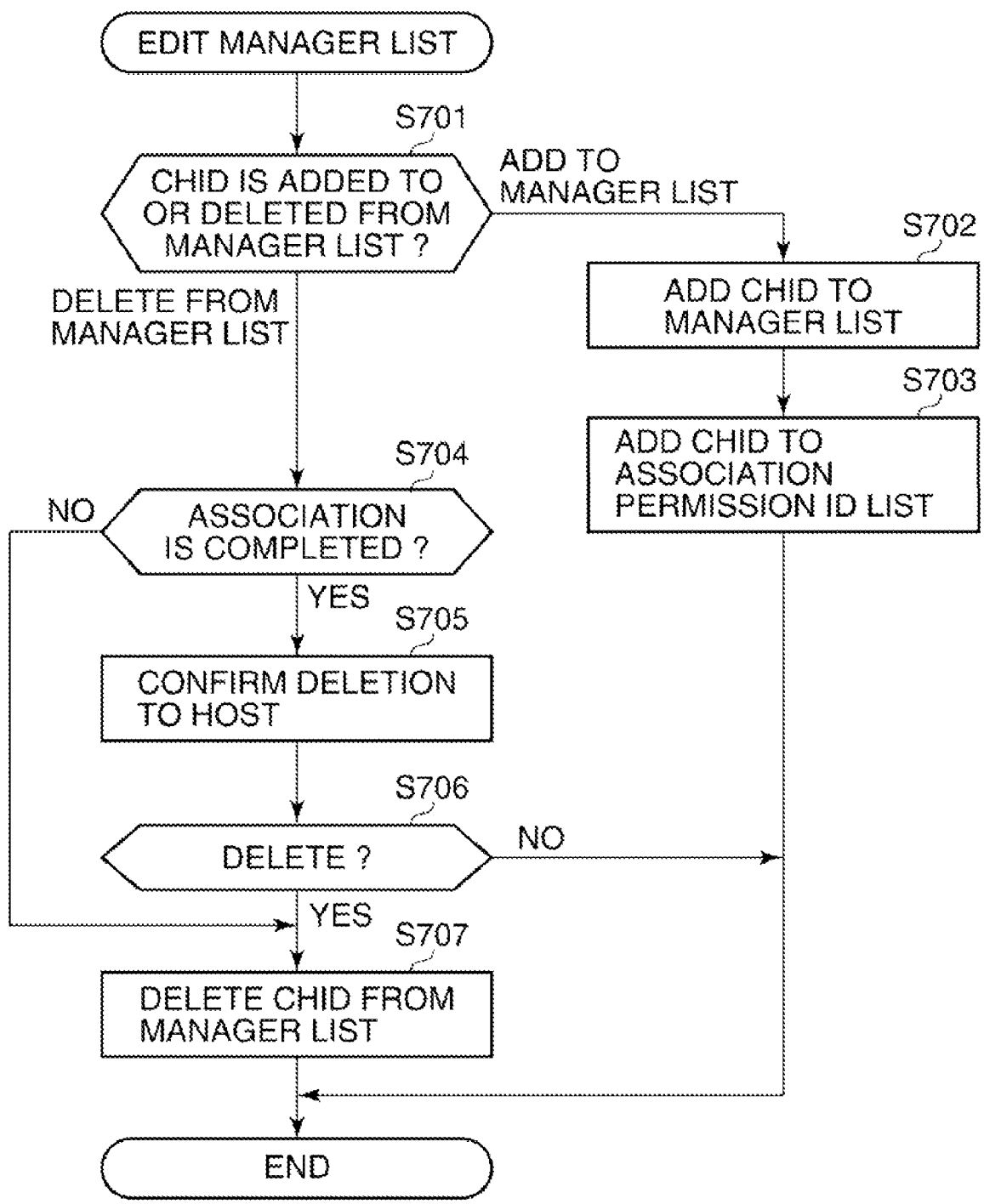
FIG. 19 is a flowchart showing an example of a process of the image processing apparatus when editing the manager list in step S406 in FIG. 14.

FIG. 19 is a flowchart showing an example of a process of the image processing apparatus 20 when editing the manager list in the step S406 in FIG. 14. Each process in FIG. 19 is achieved by loading a control program stored in the ROM 204, the HDD 209 or the like of the image processing apparatus 20 onto the RAM 205 and by executing the program by the CPU 203.

In step S701, the CPU 203 determines whether the CHID received from the host PC 10 is added to or deleted from the manager list. When the CHID is added, the process proceeds to step S702. When the CHID is deleted, the process proceeds to step S704.

In the step S702, the CPU 203 adds the CHID received from the host PC 10 to the manager list in the manager list storage area 211, and proceeds with the process to step S703.

In the step S703, the CPU 203 adds the CHID received from the host PC 10 to the association permission ID list in the association permission ID list storage area 212, and finishes the process.

In the step S704, the CPU 203 determines whether the host PC to be deleted completed the association process. When the association process was not completed, the process proceeds to step S707. When the association process was completed, the process proceeds to step S705.

In the step S705, the CPU 203 outputs a display instruction of a confirmation screen from the printer 201 to the host PC 10, displays the confirmation screen shown in FIG. 21, for example, on the display device 101 of the host PC 10, and proceeds with the process to step S706. If the CHID of the host PC that completed the association process once is deleted from the manager list, the edit of the manager list and the association permission ID list become impossible. Accordingly, the confirmation screen is displayed on the display device 101 of the host PC 10 to urge the user of the host PC to confirm.

In the step S706, the CPU 203 determines whether the user pushed an OK button (to delete) or a cancel button (not to delete) in the confirmation screen on the display device 101 of the host PC 10 shown in FIG. 21. When an operation signal of the OK button is received, the process proceeds to step S707. When an operation signal of the cancel button is received, the process is finished.

In the step S707, the CPU 203 deletes the CHID of the host PC 10 to be deleted from the manager list in the manager list storage area 211, and finishes the process. Although the host PC 10 of which the CHID was deleted from the manager list can connect to the image processing apparatus 20 by the regular wireless USB connection, editing of the manager list and the association permission ID list stored in the image processing apparatus 20 becomes impossible.

As described above, in this embodiment, when deleting the CHID of the host PC 10 that completed the association process, the confirmation screen is displayed on the display device 101 of the host PC 10 to urge the user of the host PC to confirm. This enables to prevent that the CHID of the host PC 10 that completed the association process is accidentally deleted from the manager list and the association permission ID list.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-051982, filed on Mar. 5, 2009 which is hereby incorporated by reference herein in its entirety.

What is claimed is:

1. An image processing apparatus that is possible to perform wireless communication with a host apparatus to receive data from the host apparatus, the image processing apparatus comprising:
   a processing unit adapted to perform an association process with the host apparatus in order to perform the wireless communication;
   a storage unit adapted to store a permitted host ID indicating the host apparatus that is permitted to perform the association process by said processing unit; and
   a control unit adapted to compare a host ID transmitted from the host apparatus with the permitted host ID stored in said storage unit and to determine whether said processing unit performs the association process based on a result of the comparison when said processing unit performs the association process.

2. The image processing apparatus according to claim 1, wherein:
   said storage unit stores a manager host ID indicating the host apparatus that is used by a user who becomes a manager, and
   said control unit permits, when a host ID identical to the host ID that is transmitted from the host apparatus is stored in said storage unit as the manager host ID, the host apparatus concerned to edit the permitted host ID stored in said storage unit.

3. The image processing apparatus according to claim 2, wherein said control unit displays a confirmation screen on a display device of the host apparatus concerned, when the host apparatus to which the edit of the permitted host ID is permitted deletes the permitted host ID.

4. The image processing apparatus according to claim 2, wherein:
   said storage unit stores a connection context obtained when said processing unit performs the association process, and
   said control unit determines, when the host apparatus to which the edit of the permitted host ID is permitted deletes the permitted host ID, whether a connection context including the host ID identical to the permitted host ID to be deleted is stored in said storage unit, and deletes the connection context concerned when the connection context including the host ID identical to the permitted host ID to be deleted is stored in said storage unit.

5. The image processing apparatus according to claim 2, wherein said control unit stores, when the processing unit performs the association process under a condition where no manager host ID is stored in said storage unit, the host ID of the host apparatus that performs the association process into said storage unit as the manager host ID.

6. The image processing apparatus according to claim 3, further comprising:
   a management unit adapted to manage whether the association process has been completed by said processing unit for each the permitted host ID stored in said storage unit, and
   wherein said control unit displays, when the host apparatus to which the edit of the permitted host ID is permitted deletes the permitted host ID, the confirmation screen on the display device of the host apparatus concerned.

7. The image processing apparatus according to claim 1, wherein the wireless communication is wireless USB communication.

8. The image processing apparatus according to claim 1, further comprising a printing unit adapted to receive print data from the host apparatus by performing the wireless communication, and to perform a print process based on the received print data.

9. A control method for an image processing apparatus that is possible to perform wireless communication with a host apparatus to receive data from the host apparatus, the control method comprising:
   a processing step of performing an association process with the host apparatus in order to perform the wireless communication;
   a storing step of storing a permitted host ID indicating the host apparatus that is permitted to perform the association process in said processing step; and
   a control step of comparing a host ID transmitted from the host apparatus with the permitted host ID stored in said storing step and of determining whether the association process is performed in said processing step based on a result of the comparison when the association process is performed in said processing step.

10. A non-transitory computer-readable storage medium storing a control program causing a computer to execute a control method for an image processing apparatus that is possible to perform wireless communication with a host apparatus to receive data from the host apparatus, the control method comprising:
   a processing step of performing an association process with the host apparatus in order to perform the wireless communication;
   a storing step of storing a permitted host ID indicating the host apparatus that is permitted to perform the association process in said processing step; and
   a control step of comparing a host ID transmitted from the host apparatus with the permitted host ID stored in said storing step and of determining whether the association process is performed in said processing step based on a result of the comparison when the association process is performed in said processing step.

11. An image processing apparatus that is possible to perform wireless communication with a host apparatus to receive data from the host apparatus, the image processing apparatus comprising:
   a storage device that stores a permitted host ID associated with the host apparatus; and
   a microprocessor programmed to provide:
      a wireless communication task that performs an association process with the host apparatus to perform the wireless communication;
      a control task that compares a host ID transmitted from the host apparatus with the permitted host ID stored in the storage device and determines whether the wireless communication task is performing the wireless communication based on a result of the comparison when the wireless communication task performs the association process.

* * * * *